(12) United States Patent
Noguchi et al.

(10) Patent No.: US 8,340,451 B2
(45) Date of Patent: Dec. 25, 2012

(54) METHOD FOR CONSTRUCTING IMAGE DATABASE FOR OBJECT RECOGNITION, PROCESSING APPARATUS AND PROCESSING PROGRAM

(75) Inventors: Kazuto Noguchi, Sakai (JP); Koichi Kise, Sakai (JP); Masakazu Iwamura, Sakai (JP)

(73) Assignee: Osaka Prefecture University Public Corporation, Osaka (JP)

( * ) Notice: Subject to any disclaimer, the term of this patent is extended or adjusted under 35 U.S.C. 154(b) by 7 days.

(21) Appl. No.: 12/989,906

(22) PCT Filed: Apr. 27, 2009

(86) PCT No.: PCT/JP2009/058285
§ 371 (c)(1),
(2), (4) Date: Nov. 29, 2010

(87) PCT Pub. No.: WO2009/133856
PCT Pub. Date: Nov. 5, 2009

(65) Prior Publication Data
US 2011/0164826 A1 Jul. 7, 2011

(30) Foreign Application Priority Data

Apr. 28, 2008 (JP) ................................. 2008-117359
May 1, 2008 (JP) ................................. 2008-119853

(51) Int. Cl.
*G06K 9/00* (2006.01)
*H04N 11/02* (2006.01)
*G10L 19/12* (2006.01)
(52) U.S. Cl. .................... 382/253; 375/240.03; 704/222
(58) Field of Classification Search .................. 382/190, 382/224, 251, 253; 375/240.03, 240.22, 375/245; 704/222, 230, 256.8; 707/698, 707/747; 711/208, 216; 712/3
See application file for complete search history.

(56) References Cited

U.S. PATENT DOCUMENTS 7,035,467 B2 * 4/2006 Nicponski ..................... 382/224
2010/0027895 A1 * 2/2010 Noguchi et al. .............. 382/224

FOREIGN PATENT DOCUMENTS

| KP | 10-0578614 B1 | 10/2005 |
| WO | WO 2004/008391 A1 | 1/2004 |
| WO | WO 2008/026414 A1 | 3/2008 |

* cited by examiner

OTHER PUBLICATIONS

International Search Report for PCT/JP2009/058285 dated Jun. 2, 2009.

*Primary Examiner* — Abolfazl Tabatabai
(74) *Attorney, Agent, or Firm* — Birch, Stewart, Kolasch & Birch, LLP

(57) ABSTRACT

Provided is a method for constructing an image database for object recognition, which includes a feature extraction step of extracting local descriptors from object images which are to be stored in an image database, a scalar quantization step of quantizing a numeric value indicating each dimension of each of the local descriptors into a predetermined number of bit digits, and a storing step of organizing each of the local descriptors after the quantization to be able to be searched for in the closest vicinity, giving to the local descriptor an identifier of the image from which the local descriptor has been extracted, and storing the local descriptor to which the identifiers are given in the image database. The storing step comprises extracting the local descriptors from the object images when a search query is given, scalar-quantizing each dimension, determining a local descriptor in the closest vicinity of each of the local descriptors from the image database, and storing each local descriptors so as to be able to identify one image by majority vote processing from the images including any determined local descriptor. The scalar quantization step comprises quantizing each dimension of each of the local descriptors into 8 bits or less. Also provided are a processing program for the method and a processing device for performing the processing.

10 Claims, 11 Drawing Sheets

(a)          (b)          (c)

(a) SHOOTING ANGLE 90°

(b) SHOOTING ANGLE 75°

(c) SHOOTING ANGLE 60°

(d) PART OF SHOT RANGE

METHOD FOR CONSTRUCTING IMAGE DATABASE FOR OBJECT RECOGNITION, PROCESSING APPARATUS AND PROCESSING PROGRAM

TECHNICAL FIELD

The present invention relates to a method for constructing an image database for object recognition, a processing apparatus and a processing program More particularly, the present invention relates to: a method for constructing an image database capable of retrieving an image showing an object matching an object shown by an image of a query from among a database of images; and an apparatus and a program for processing the image database.

BACKGROUND ART

Local descriptors in SIFT (Scale-Invariant Feature Transform) or the like can realize object recognition that is relatively robust to occlusion or variation of a lighting condition, and thus, currently, the local descriptors attract attention (e.g., see Non-Patent Literatures 1 and 2). A model called "Bag of Words" or "Bag of Features" is basically used for recognition. In this model, locations or co-occurrences of the local descriptors are not considered. Only the frequency of occurrences of the local descriptors is used for recognizing an object.

Here, the local descriptors represent local features of an image. The local descriptors are extracted through a predetermined procedure so as to have characteristics that are robust to variation (geometric transformation, lighting conditions, or variation of resolutions) of an image. In addition, because the local descriptors are determined from a local area of an image, the local descriptors are robust also to occlusion. In the present specification, the local descriptors are also referred to as feature vectors because the local descriptors are represented as vectors.

In general, the number of local descriptors extracted from an image is several hundreds to several thousands, or sometimes reaches several tens of thousands. Therefore, an enormous amount of processing time is needed for matching of the local descriptors, and an enormous amount of memory is needed for storing the local descriptors. Therefore, the important research subject is how to reduce the amount of processing time and the amount of memory while keeping a recognition accuracy at a certain level.

For example, in the SIFT, as typical local descriptors, each local descriptor is represented as a 128-dimensional vector. In addition, there is known a PCA-SIFT that uses a vector having reduced dimension from that of the SIFT by performing principal component analysis. However, an example of local descriptors used in a practical PCA-SIFT is 36-dimensional vectors. Moreover, a general data type for representing the value of each dimension is a 32-bit float type or integer type which is applied to general numerical representations. When a higher accuracy is needed, a 64-bit double type is used. On the other hand, when a limited range of values are used or when it is desired to reduce the amount of memory even while sacrificing the accuracy, a 16-bit short integer type can be specially used. Even in the PCA-SIFT using a 36-dimensional vector and specially using the short integer type to prioritize reduction of the amount of data, each local descriptor needs a memory of 16 bits×36 dimensions=512 bits (64 bytes).

In general, nearest neighbor searching calculates the distance between vectors and determines the nearest local descriptor. It has been commonly considered that if an accuracy of data of each dimension is decreased, accurate nearest neighbor searching cannot be performed, and therefore, an accuracy (recognition rate) of recognition of an image is decreased.

Accordingly, many conventional techniques employ the following approach. Local descriptors obtained from an image for constructing a model are vector-quantized (a technique of classifying local descriptors into a predetermined number of groups such that each group includes similar local descriptors, and then expressing each local descriptor included in the same group by a representative value thereof, i.e., clustering), several thousand to several hundred thousand visual words (which correspond to the above representative values) are determined, and an image is described by using the visual words (e.g., see Non-Patent Literature 3). Upon recognition of an unknown image, local descriptors obtained from the image are converted into visual words, and the frequency and the like are measured. In such an approach, if the number of visual words is sufficiently small, high-speed processing can be expected. On the other hand, it is pointed out that, if the number of visual words is large, a sufficient recognition rate cannot be attained (e.g., see Non-Patent Literature 4). The larger the number of visual words is, the more difficult it is to ignore calculation time needed for vector quantization. In addition, a problem arises with respect to the amount of memory for storing the visual words.

The above advantage and problem are the most prominent in an extreme case, that is, when individual local descriptors obtained from an image for constructing a model are directly converted into visual words. For example, about two thousand local descriptors are extracted from a general VGA-size image. Therefore, when hundred thousand VGA-size images are used for constructing a model, the number of visual words is two hundred millions, and enormous amount of calculation resources are needed for matching and storage. Meanwhile, when a large number of local descriptors are used for a model, highly accurate recognition can be realized.

One of solutions to the problem of processing time is to introduce "approximate nearest neighbor searching" in matching of local descriptors (e.g., see Non-Patent Literature 5 and Patent Literature 1). It is known that for example, when a recognition task of the above magnitude is to be performed, the "approximate nearest neighbor searching" enables the processing time to be smaller than $10^{-6}$ times the processing time taken for simply performing matching of all local descriptors, without almost any decreasing of the recognition rate. On the other hand, one of solutions to the problem of the amount of memory is to performing vector quantization more roughly. However, this solution is not necessarily preferable because the recognition rate decreases.

Citation List

Patent Literature

Patent Literature 1: International Publication WO2008/026414

Non-Patent Literature

Non-Patent Literature 1: D. Lowe, "Distinctive image features from scale-invariant keypoints", International Journal of Computer Vision, vol. 60, no.2, pp. 91-110, 2004

Non-Patent Literature 2: J. Ponce, M. Hebert, C. Schmid, and A. Zisserman Eds., Toward Category-Level Object Recognition, Springer, 2006

Non-Patent Literature 3: J. Sivic and A. Zisserman, Video google: A text retrieval approach to object matching in videos, Proc. ICCV2003, Vol. 2, pp. 1470-1477, 2003

Non-Patent Literature 4: D. Nister and H. Stewenius, Scalable recognition with a vocabulary tree, Proc. CVPR2006, pp. 775-781, 2006

Non-Patent Literature 5: Kazuto Noguchi, koichi Kise, Masakazu Iwamura, "Efficient Recognition of Objects by Cascading Approximate Nearest Neighbor Searchers", Meeting on image recognition and understanding (MIRU 2007) Collection of papers, pp. 111-118, July, 2007

SUMMARY OF THE INVENTION

Disclosure of the Invention

In view of the circumstances as described above, the present invention provides a solution from a viewpoint different from conventional viewpoints. That is, the present invention provides a solution from a viewpoint of how to reduce the processing time and the amount of memory while keeping the recognition accuracy at a certain level in the object recognition using local descriptors.

Specifically, the inventors have examined a possibility of minimizing an accuracy of a number representing each dimension of local descriptors within a scope in which an influence on the recognition rate can be ignored. This is because the inventors have considered as follows. That is, a technique capable of retrieving the nearest local descriptor from multiple local descriptors in a short time has been provided as in Patent Literature 1, and therefore, if reduction of the amount of memory is attained to some degree, it becomes possible to realize highly accurate object recognition by direct retrieval without using visual words.

Particularly, in the case of recognition of the instance of an object as well as recognition of the class of an object, highly accurate, high-speed, memory efficient technique may be preferred. Since the visual words substantially involve grouping, the visual words will be effective for the recognition in the class level, but is not compatible with the recognition in the instance level. The technique of the present invention is considered to be particularly effective for the recognition in the instance level. However, this should not be deemed to exclude the employment of the technique of the present invention into the recognition in the class level, and into the technique using the visual words.

Here, recognition of the class is such that when an object of recognition (query) is given, for example, the class of the object such as a chair or an automobile is returned as a result (recognized). Whereas, recognition of the instance is such that for example, the instance of the object such as a specific model in the class of an automobile is to be recognized.

Solution to the Problems

As a result of earnest examinations, the inventors have found that, contrary to the above-described common sense of the art, even if each dimension of each local descriptor is represented by bits less than those of real-type data or int-type data, the recognition rate hardly decreases as long as each dimension is represented by 2 or more bits. It is common sense in the art that each dimension of a feature vector is represented by using real-type data or int-type data, specifically, 32-bit data. However, the inventors have found that even if each dimension of each local descriptor is represented at an accuracy based on bits less than the above bits, for example, bits equal to or less than 8 bits, the recognition rate hardly decreases as long as each dimension is represented by 2 or more bits. In addition, the inventors have found that even if each dimension is represented by 1 bit, a preferable result close to the recognition rate in the case of 2 bits can be obtained in comparison with the case of 0 bits, that is, a technique in which the distance between vectors is not calculated. Moreover, the inventors have found that majority voting processing significantly contributes to this result. Then, the inventors have filed the present application, based on the above-described knowledge.

That is, the present invention does not employ an approach of narrowing down visual words obtained by vector quantization, but employs an approach of reducing the amount of memory needed for storing the local descriptors, as means for solving the aforementioned problems. Specifically, the number of bits of each dimension needed for the storage, of the vector representing each local descriptor, is reduced to bits less than those of real-type data or int-type data (32 bits). This processing can be considered as processing of performing scalar quantization for local descriptors.

The present invention provides a method for constructing an image database that is used for object recognition comprising the steps of: extracting, from an image showing an object and to be stored in the image database, a plurality of local descriptors each of which is a vector representing respective local features of the image; scalar-quantizing the vector on a dimension by dimension basis of the vector; and storing into the image database the image and the corresponding vectors being quantized through the scalar quantization step, with organizing the vectors in such a manner that each vector is adapted to be used for approximate nearest neighbor searching and that respective image IDs for identifying the image from which each vector is extracted are attached thereto; wherein each of the steps is executed by a computer and the storing step stores each vector so that, when an image showing an object in question is given as a query while a plurality of images are stored in the image database, the computer extracts a plurality of query local descriptors from the query through a similar step to the feature extraction step, quantizes each query local descriptor through a similar step to the scalar quantization step, retrieves vectors as neighbor vectors of each query local descriptor, each of which is retrieved from the vectors stored in the image database by using an algorithm of the approximate nearest neighbor searching, obtains the image IDs attached to the neighbor vectors and determines at least one image(s) which shows the object in question based on the obtained image IDs; and wherein the scalar quantization step quantizes each vector dimension into a scalar number having a predetermined number of bits.

In addition, from another viewpoint, the present invention provides an apparatus for processing an image database that is used for object recognition comprising: a feature extraction section for extracting, from an image showing an object and to be stored in the image database, a plurality of local descriptors each of which is a vector representing respective local features of the image; a scalar quantization section for scalar-quantizing the vector on a dimension by dimension basis of the vector; a storing section for storing into the image database the image and the corresponding vectors being quantized through the scalar quantization step, with organizing the vectors in such a manner that each vector is adapted to be used for approximate nearest neighbor searching and that respective image IDs for identifying the image from which each vector is extracted are attached thereto; and a retrieval section, when an image showing an object in question is given as a query while a plurality of images are stored in the image database, and after the extraction section extracts a plurality of query local descriptors from the query in a similar manner as in the image to be stored and the scalar quantization section quantizes each query local descriptor in a similar manner as in the image to be stored, for retrieving neighbor vectors for respective query local descriptor among the vectors stored in the image database using an algorithm of the approximate nearest neighbor searching, obtaining the image IDs attached to the neighbor vectors, and determining at least one image(s) which shows the object in question based on the obtained image IDs, wherein the scalar quantization step quantizes each vector dimension into a scalar number having a predetermined number of bits.

From still another viewpoint, the present invention provides a program for processing an image database that is used for object recognition, the apparatus causing a computer to function as: a feature extraction section for extracting, from an image showing an object and to be stored in the image database, a plurality of local descriptors each of which is a vector representing respective local features of the image; a scalar quantization section for scalar-quantizing the vector on a dimension by dimension basis of the vector; a storing section for storing into the image database the image and the corresponding vectors being quantized through the scalar quantization step, with organizing the vectors in such a manner that each vector is adapted to be used for approximate nearest neighbor searching and that respective image IDs for identifying the image from which each vector is extracted are attached thereto; and a retrieval section, when an image showing an object in question is given as a query while a plurality of images are stored in the image database, and after the extraction section extracts a plurality of query local descriptors from the query in a similar manner as in the image to be stored and the scalar quantization section quantizes each query local descriptor in a similar manner as in the image to be stored, for retrieving neighbor vectors for respective query local descriptor among the vectors stored in the image database using an algorithm of the approximate nearest neighbor searching, obtaining the image IDs attached to the neighbor vectors, and determining at least one image(s) which shows the object in question based on the obtained image IDs, wherein the scalar quantization step quantizes each vector dimension into a scalar number having a predetermined number of bits.

Effects of the Invention

In the method for constructing an image database for object recognition according to the present invention, the scalar quantization step quantizes each dimension of each local descriptor into bits less than those of real-type data or int-type data. Thus, the amount of memory needed for representing each local descriptor can be reduced. Accordingly, even if a large number of local descriptors (or visual words) are to be stored, an image database can be constructed with a reduced amount of memory, in comparison with a conventional technique that does not perform the scalar quantization step.

Based on the common sense, it is anticipated that representing feature vectors by a small number of bits has a negative influence such as reduction of the recognition rate. However, as indicated by the result of experiments described later, the inventors have found that even if the number of bits of each dimension is reduced to 2 bits, the recognition rate hardly decreases in comparison with the case where quantization is not performed. Even if the number of bits of each dimension is 1 bit, a significantly high recognition rate is obtained in comparison with the case of 0 bits, that is, a technique in which the distance between vectors is not calculated.

In the present invention, local descriptors represent local features of an image by vectors. A specific mode for local descriptors is, for example, the SIFT. In embodiments described later, the PCA-SIFT is applied as an example of modes for local descriptors.

Local descriptors being organized in such a manner that each vector is adapted to be used for approximate nearest neighbor searching means that local descriptors are extracted from an image to be stored in an image database, and that the local descriptors are stored as a database so as to correspond to the image. The nearest neighbor searching is processing of, when a local descriptor is given, determining a local descriptor that is the nearest neighbor of the given local descriptor, from among local descriptors stored in the database. An example of a technique of evaluating whether or not a local descriptor is the nearest neighbor is to calculate the distance between two vectors and determine a vector at the shortest distance as the nearest neighbor.

Hereinafter, preferred modes of the present invention will be described.

Preferably, the scalar quantization step quantizes each dimension of each local descriptor to 8 bits or less. More preferably, the scalar quantization step quantizes each dimension of each local descriptor to 2 bits. As will be indicated by the result of experiments described later, for example, when the number of bits for storing each dimension of a feature vector is 2 bits, a required amount of memory can be reduced (about ⅓, in the experiments described later) in comparison with the case where quantization is not performed. In this case, although the processing time slightly increases (about 1.6 times, in the experiments described later) owing to a bit calculation, the recognition rate hardly decreases. In addition, also in the case where the number of bits of each dimension is 8 bits, a required amount of memory can be reduced to about ⅔, in the experiments described later.

In addition, the storing step calculates an index value of a hash table from each quantized local descriptor by using a predetermined hash function, and stores the value of each dimension of each quantized local descriptor, an ID for identifying an image to be stored, and a reference destination of the image, such that they correspond to the calculated index value. Further, when the number of the local descriptors to be stored corresponding to the same index value exceeds a predetermined number, the storing step may store no local descriptor corresponding to the index value. By using a hash table, high-speed nearest neighbor searching processing can be realized. Moreover, when the number of the local descriptors to be stored corresponding to the same index value exceeds a predetermined number, if no local descriptor corresponding to the index value is stored, local descriptors having low discriminability can be excluded from targets of the nearest neighbor searching processing. Therefore, retrieval can be performed in a shorter time without sacrificing an accuracy of the retrieval.

In the case where there are a large number of local descriptors sharing one index of the hash table, the local descriptors have low discriminability. That is, when an index value is calculated from a local descriptor of an input image, and the hash table is referred to, many candidates sharing the index are stored therein. Such local descriptors do not contribute to narrowing down of the recognition targets, and thus have low discriminability. If such local descriptors that have low discriminability are excluded from the retrieval targets, only local descriptors having high discriminability are referred to, whereby efficient recognition can be performed.

In addition, when quantizing local descriptors extracted from a query, the scalar quantization step may calculate index values for a plurality of values around a threshold value of quantization, and may determine the nearest neighbor local descriptor from among stored local descriptors corresponding to any of the index values. Thus, since index values of the hash are calculated so as to include a range of error caused by quantization, decrease in the recognition rate by quantization can be suppressed.

For example, if an image stored in the image database shows an object of a query from a viewpoint different from that of the query, the values of dimensions of a feature vector of the stored image might be different from the respective values of dimensions of the corresponding feature vector of the query. That is, although each feature vector has a characteristic robust to variation of a viewpoint (geometric transformation), the value of each dimension is not a completely invariant value, and can vary. For a hash table, an index value which is a discrete value is calculated from the value of each dimension of each feature vector through a predetermined procedure of calculation (calculation using a hash function). Here, after quantization, if the value of each dimension of the feature vector is different from that of the corresponding feature vector owing to variation, there is a high possibility that a different index value is calculated from the feature vector. If an index value of a feature vector of a retrieval target is different from that of a feature vector of a query, a correct retrieval result cannot be obtained from the pair of feature vectors. Accordingly, in consideration of the case where the value of each dimension varies to exceed a threshold value of quantization, index values are calculated not only from the value of each quantized dimension but also from values around the threshold value of quantization, and the nearest neighbor feature vector is determined from among stored feature vectors corresponding to any of the calculated index values. Thus, decrease in the recognition rate caused by variation can be suppressed. In other words, in the case where the value of a dimension of a feature vector is close to a threshold value of quantization, index values are calculated in consideration of a possibility that the value is around the threshold value, thereby ensuring the recognition rate.

The feature extraction step may extract, as local descriptors, vectors whose dimensions are represented by 32 bits.

In addition, processing of determining a local descriptor that is the nearest neighbor of each local descriptor of the query may be processing of calculating the distance to each local descriptor and determining a local descriptor at the shortest distance.

The various preferred modes described herein may be also realized by combining any of these modes.

DESCRIPTION OF EMBODIMENTS

Figure 1:
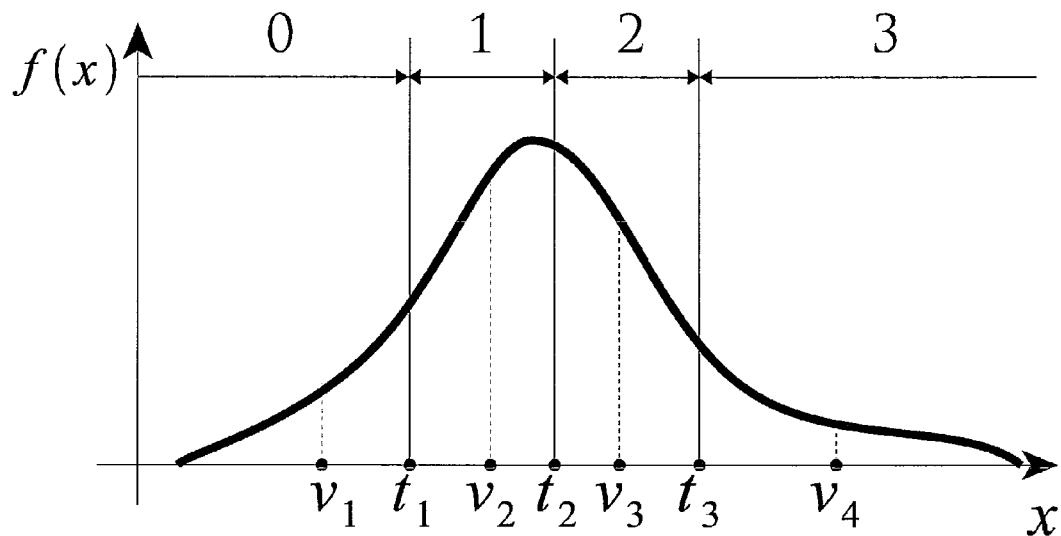
FIG. 1 is an explanatory diagram for explaining an example of a technique of scalar quantization according to the present invention.

<Conventional Method of Approximate Nearest Neighbor Searching>

Prior to detailed description of the present invention, the outline of a conventional technique of the approximate nearest neighbor searching will be described. The conventional technique described below is used in the experiments described later.

In the nearest neighbor searching, processing requiring the longest time is distance calculations. As a method of performing the nearest neighbor searching at a high speed, there are two methods, i.e., a method of performing individual distance calculations at a high speed, and a method of efficiently narrowing down targets of distance calculations. In the approximate nearest neighbor searching, mainly the latter narrowing-down method is boldly performed to reduce the processing time. However, in compensation for this method, there is a possibility that the nearest neighbor is excluded from the targets of distance calculations and therefore cannot be obtained. An appropriate degree of approximation is depending on a task to be performed. Therefore, the approximate nearest neighbor searching uses parameters for adjusting the degree of approximation. Hereinafter, an ANN will be described as a typical technique of the approximate nearest neighbor searching.

The ANN (abbreviation of Approximate Nearest Neighbor, see, for details, S. Arya, D. M. Mount, R. Silverman and A. Y. Wu, "An optimal algorithm for approximate nearest neighbor searching," Journal of the ACM, vol. 45, no. 6, pp. 891-923, 1998) is a technique of performing the approximate nearest neighbor searching at a high speed by using a binary tree. A tree node corresponds to a hyperrectangle obtained by dividing a feature space, and a leaf node corresponds to a single feature vector. The ANN collects feature vectors to be subjected to distance calculations, by searching a tree structure, and outputs, as a result of the approximate nearest neighbor searching, a feature vector at the shortest distance among the collected feature vectors. The ANN uses an allowable error $\alpha$ as a parameter representing the degree of approximation. If $\alpha$ is larger, a larger degree of approximation is performed to narrow down feature vectors to be subjected to distance calculations, and thus processing time can be reduced.

<Embodiments>

Hereinafter, the present invention will be described in more detail with reference to the drawings. It is noted that the description below is merely an example in all aspects, and should not be deemed to limit the present invention.

1.1. Concept

A problem of the conventional technique of recognition using local descriptors is that because of a large number of feature vectors, a memory usage and processing time enormously increase when large-scale recognition is performed.

Regarding the problem of the processing time, Noguchi, et al., propose a technique (see Non-Patent Literature 5 and Patent Literature 1) of reducing the processing time by providing a cascade of recognizers for the approximate nearest neighbor searching. However, in this technique, the problem of the memory usage is not taken into consideration. According to the breakdown of the memory usage in this technique, it is found that about 80 percent of a memory is used for storing feature vectors. Accordingly, in the present embodiment, it is attempted to reduce the memory usage by quantizing feature vectors so as to be represented by a smaller number of bits, based on the technique of Noguchi, et al.

Typical examples of a method of quantizing vectors are vector quantization and scalar quantization. In the vector quantization, a certain number of representative vectors are obtained in advance, and then a code of an input vector is replaced by that of the nearest neighbor representative vector. The vector quantization is often used for a technique of recognition using local descriptors (see Non-Patent Literature 3). However, it is difficult to efficiently obtain representative vectors (the aforementioned visual words) having few quantization errors from large-scale data. In addition, if the number of the representative vectors increases, there arises a problem that it takes a long time to perform processing of retrieving a representative vector that is the nearest neighbor of an input vector. On the other hand, in the scalar quantization, each dimension of an input vector is quantized. Quantization errors are large in comparison with vector quantization based on the same code number. However, in the scalar quantization, it is considered that the processing time is reduced because it is not necessary to perform the nearest neighbor searching upon quantization. Accordingly, the present invention uses the scalar quantization while considering the processing time.

Quantization has not only an advantage that a memory usage can be reduced, but also a problem that there is a possibility of the recognition rate decreasing. This is because originally different feature vectors are quantized to be the same feature vectors, and thereby the discriminability decreases. The influence of the decrease of the discriminability of feature vectors on the recognition rate cannot be easily figured out because the result of the recognition in the present invention is determined by voting. This is because even if votes are erroneously cast for other images, erroneous recognition does not occur as long as the number of the erroneous votes does not exceed the number of correct votes. Accordingly, the relation between the number of bits in quantization and the recognition rate will be examined through experiments.

1.2. Scalar Quantization

First, scalar quantization according to the present invention will be described. In the scalar quantization, each dimension is quantized. FIG. 1 shows the case where each dimension is quantized into 2 bits. f(x) is a distribution of feature vectors with respect to a certain dimension. t is a threshold value of quantization. For example, feature vectors in a range from $-\infty$ to $t_1$ are encoded into 0. In a distance calculation for retrieval, a distance from a feature vector of a query to each feature vector is calculated by using v. t and v are determined for each dimension so as to satisfy the following expression.

[Expression 1]

$$\int_{-\infty}^{v_1} f(x)dx = \qquad (1)$$

$$\int_{v_1}^{t_1} f(x)dx = \int_{t_1}^{v_2} f(x)dx = \ldots = \int_{t_3}^{v_4} f(x)dx = \int_{v_4}^{\infty} f(x)dx$$

1.3. Hash Function

Similarly to the technique of Noguchi, et al., also in the present embodiment, data is stored in a hash table by using a hash function, and is used for retrieval. In order to store data in the hash table and use the data for retrieval, an index to be subjected to processing needs to be obtained by using the hash function. Here, the hash function used in the present embodiment will be described.

A 36-dimensional real-valued vector x obtained by the PCA-SIFT is the result of a principal component analysis. Therefore, the eigenvalue of an earlier dimension of the real-valued vector x is larger. Then, let the first to d-th dimensions of x be denoted by expression 2.

$$\hat{x} = (x_1, x_2, \ldots, x_d) \qquad \text{[Expression 2]}$$

$$u_j = \begin{cases} 1 & \text{if } x_j - \mu_j \geq 0, \\ 0 & \text{otherwise,} \end{cases} \qquad \text{[Expression 3]}$$

Next, by using expression 3, each dimension is converted to a binary value, thereby creating a bit vector indicated by expression 4.

$$u = (u_1, \ldots, u_d) \qquad \text{[Expression 4]}$$

Here, $\mu_j$ is an average value of all vectors $x_j$ in an image database.

[Expression 5]

$$H_{index} = \left(\sum_{i=1}^{d} u_i 2^i\right) \bmod H_{size} \qquad (2)$$

Next, a hash value is obtained by using expression 5. Here, $H_{index}$ is the size of the hash table.

1.4. Data Storage

In order to store feature vectors in the hash table, a hash value needs to be obtained by using the aforementioned hash function. In the hash table, feature vectors whose data amounts have been reduced by quantization are stored together with image IDs. When collision occurs upon storage, a plurality of feature vectors are stored as a list. In this case, if the list is excessively long, there arises a problem that the amount of distance calculations upon retrieval excessively increases. Accordingly, in the present embodiment, a threshold value c is set for a list length n. If n>c is satisfied, the whole list is eliminated from the hash table. There being a large number of feature vectors having the same hash value means that the feature vectors do not contribute much to discrimination of an image. Therefore, it is considered that the elimination of the whole list has a relatively small influence.

The above processing is performed for all feature vectors to be stored in the database, whereby storage of data is completed.

Figure 10:
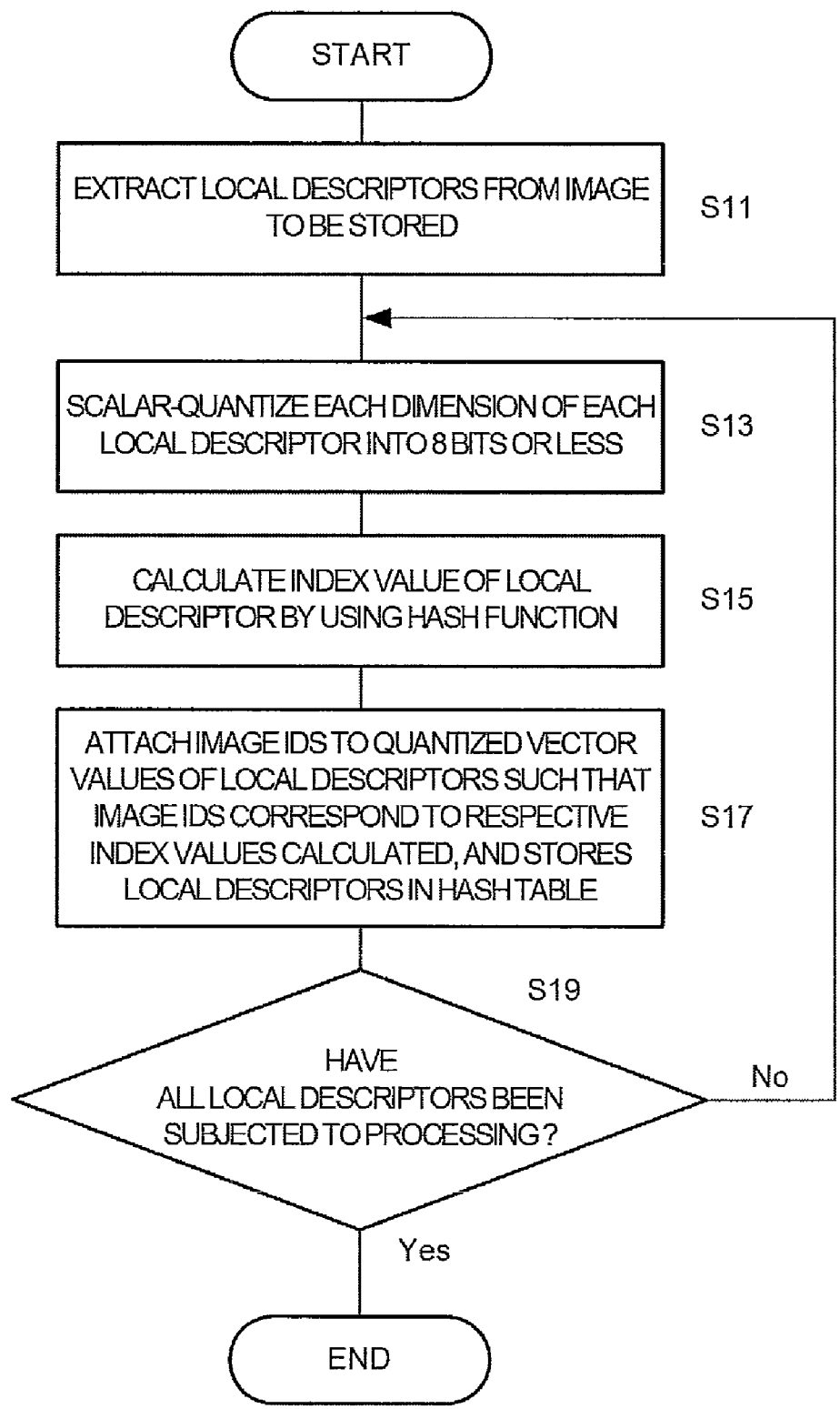
FIG. 10 is a flowchart showing a procedure of storing images in an image database for object recognition according to the present embodiment.

FIG. 10 is a flowchart showing a procedure of storing an image in an image database for object recognition according to the present embodiment. As shown in FIG. 10, when an image to be stored is inputted, a computer for processing, first, extracts local descriptors from the inputted image (step S11). Thereafter, the computer scalar-quantizes each local descriptor in accordance with the above procedure to reduce each dimension to 8 bits or less, preferably to 2 bits (step S13). Then, the computer applies the hash function to each of the quantized local descriptors to calculate an index value (step S15).

Next, the computer attaches image IDs to the quantized vector values of the local descriptors such that the image IDs correspond to the respective index values calculated, and stores the local descriptors in the hash table (step S17). That is, the computer stores the local descriptors in the image database. Here, if the number of the stored local descriptors corresponding to the same index value exceeds a predetermined number, the computer eliminates the local descriptors corresponding to the same index value from the hash table so that they are not stored. This prevents local descriptors having small discriminability from being stored in the database. Next, the computer determines whether or not all the extracted local descriptors have been stored in the hash table (step S19). If there is a local descriptor yet to be stored (No in step S19), the computer performs processing of steps S13 to S17 for the local descriptor. If all the local descriptors have been stored (Yes in step S19), storage of the image in the database is completed.

1.5. Retrieval

Next, retrieval will be described. In the present embodiment, a hash function is applied to each of feature vectors q obtained from a query Q, and feature vectors are retrieved from the hash table. When the set of the retrieved feature vectors is denoted by X, a feature vector x* that is the nearest neighbor of q is obtained from X.

Then, a vote is cast for an image ID corresponding to x*. If there are a plurality of the nearest neighbor feature vectors, voting processing is performed for all of them. Such processing as described above is performed for all the feature vectors obtained of the query, and an image that has finally obtained the largest number of votes is determined as an answer. Here, "voting" is processing used for partially counting up evidences in the field of information processing, and is processing in which: based on each of the obtained evidences, a score is given to one of choices; and the choice that has obtained a top score, as a result of counting up scores based on all the evidences, is to be chosen. Generally, the score for voting varies depending on the evidences.

In this processing, the most important is how to retrieve feature vectors corresponding to q. The simplest technique is to obtain a bit vector from q similarly to storage processing, and then to obtain feature vectors having the same hash value as that of the bit vector obtained by using the hash function. However, in this method, a sufficient recognition rate cannot be obtained for the following reason although the number of times of distance calculations are sufficiently reduced. The reason is that the value of each dimension of each feature vector varies depending on a shooting condition. If the variation amount exceeds a threshold value, each bit vector varies. As a result, feature vectors corresponding to q can no longer be obtained.

In the present embodiment, the variation is dealt with by using a variation range e of the value of each dimension as a parameter. Specifically, let q be denoted by expression 6.

$$q=(q_1,\ldots,q_d) \quad \text{[Expression 6]}$$

$$|q_j-\mu_j|\leq e \quad \text{[Expression 7]}$$

If a dimension j satisfies expression 7, feature vectors are retrieved by using not only $u_j$ but also expression 8.

$$u_j'=(u_j+1)\bmod 2 \ (1\ \text{IF}\ 0,\ \text{AND}\ 0\ \text{IF}\ 1) \quad \text{[Expression 8]}$$

However, such processing as "using both values" is introduced without restriction, enormous amount of calculation time is needed. In this processing, when the number of the dimensions to be subjected to processing is denoted by b, the hash table is accessed by using 2b patterns of bit vectors. Accordingly, in the present embodiment, the size of b is restricted so as not to be much large.

$$|q_j-\mu_j|\leq e \quad \text{[Expression 9]}$$

If the number of the dimensions satisfying expression 9 exceeds b, b dimensions having the largest indices are employed.

Figure 11:
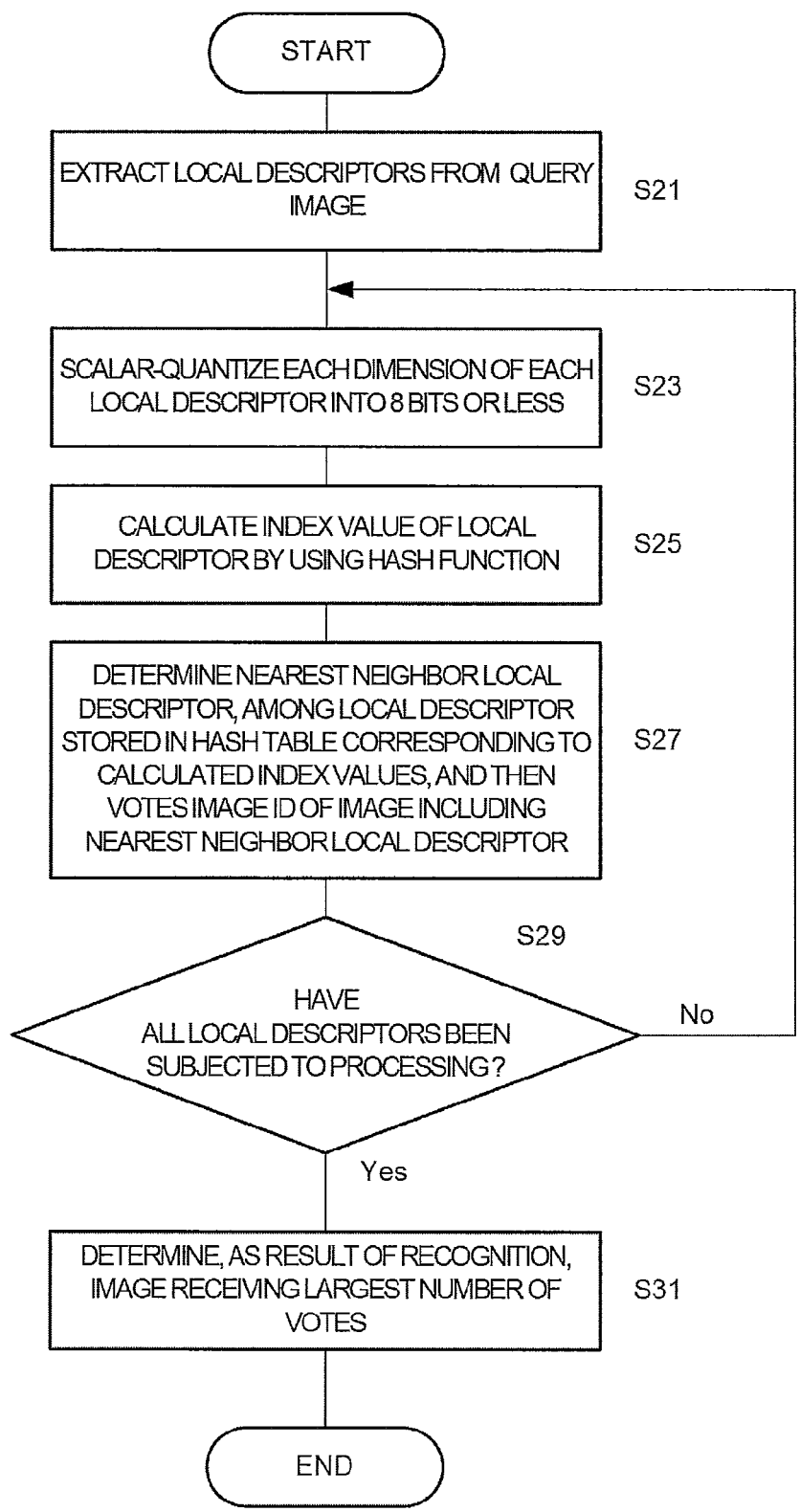
FIG. 11 is a flowchart showing a procedure of performing recognition (retrieval) by using an image database storing therein images through the procedure shown in FIG. 10.

FIG. 11 is a flowchart showing a procedure of recognition (retrieval) performed for an image database in which images are stored by the procedure shown in FIG. 10. As shown in FIG. 11, an image of a query is inputted, the computer for processing, first, extracts local descriptors from the image (step S21). Thereafter, the computer scalar-quantizes each local descriptor in accordance with the above-described procedure to reduce each dimension to 8 bits or less, preferably to 2 bits (step S23). Then, the computer applies a hash function to each of the quantized local descriptors to calculate an index value (step S25). Steps S21, S23, and S25 correspond to steps S11, S13, and S15 in FIG. 10, respectively, similar processing being performed. However, in step S25, in consideration of variation of an image, index values of a plurality of values around a threshold value of quantization are also calculated. That is, the aforementioned processing of "using both values" is further performed.

Next, the computer determines the nearest neighbor local descriptor, among local descriptors stored in the hash table corresponding to the calculated index values, and then casts a vote for an image ID of an image including the nearest neighbor local descriptor. Next, the computer determines whether or not the nearest neighbor searching has been performed for all local descriptors extracted from the query and voting based on the nearest neighbor searching has been performed (step S29). If there is a local descriptor yet to be subjected to processing (No in step S19), the computer performs processing of steps S23 to S27 for the local descriptor. If voting has been performed based on all the local descriptors (Yes in step S29), the computer outputs, as a result of the recognition, an image receiving the largest number of votes (step S31). Processing of recognition is finished here.

<Block Diagram>

Figure 12:
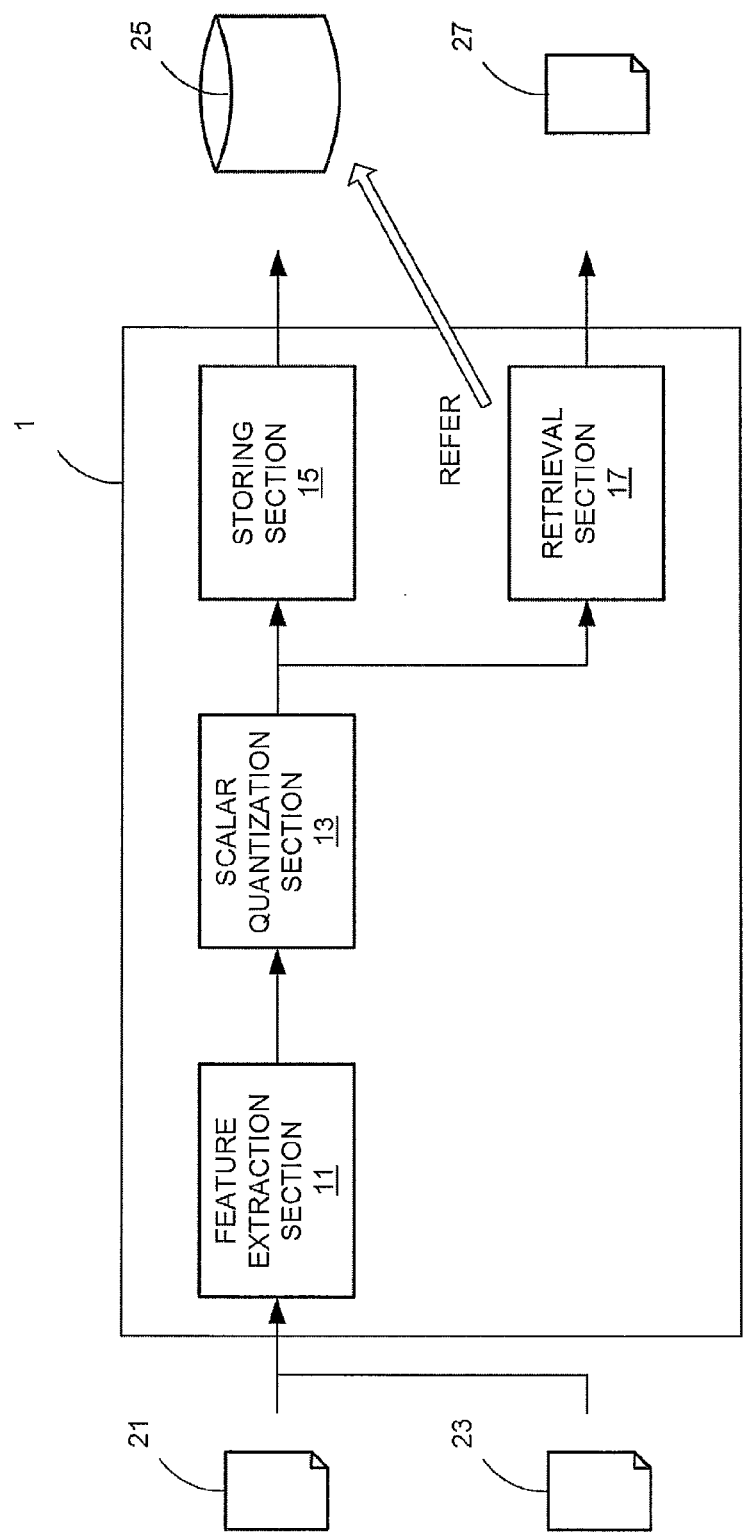
FIG. 12 is a block diagram showing a functional configuration of an apparatus for processing the image database for object recognition according to the present invention.

FIG. 12 is a block diagram showing a functional configuration of a processing apparatus for an image database for object recognition according to the present invention. Referring to FIG. 12, when an image 21 is to be stored in an image database 25, the image 21 to be stored is given to a processing apparatus 1 as an input, and data based on the image 21 is stored in the image database 25 as an output. On the other hand, when an image stored in the image database 25 is to be retrieved, a query 23 is given to the processing apparatus 1 as an input, and with reference to the database 25, the processing apparatus 1 outputs an image 27 which is stored in the image database 25, or information identifying the image 27.

A feature extraction section 11 extracts feature vectors from the image 21 or the inputted query 23. A scalar quantization section 13 scalar-quantizes the extracted feature vectors. A storing section 15 attaches, to data of each scalar-quantized feature vector, an ID for identifying an image from which the scalar-quantized feature vector is extracted, and stores the data in the image database 25. A retrieval section 17 determines, among the local descriptor stored in the image database 25, a local descriptor that is the nearest neighbor of each scalar-quantized feature vector by performing the nearest neighbor searching processing. Then, the retrieval section 17 casts a vote for an image including the determined local descriptor, and based on a result of the voting performed with respect to each local descriptor included in the query, specifies one image from among images stored in the image database 25. The retrieval section 17 outputs a specified image 27 or information identifying the image 27 as a recognition result.

Hardware for realizing functions of the feature extraction section 11, the scalar quantization section 13, the storing section 15, and the retrieval section 17 in FIG. 12 is mainly a computer and a memory. That is, a computer executes a predetermined processing program for the image database for object recognition, thereby realizing the functions of the above sections.

<Experiments>

2.1. Experiment Condition

In the experiments, the ANN which is a conventional technique of the approximate nearest neighbor searching was compared with the above embodiment. Here, a source code provided on the Internet <URL: http://www.cs.umd.edu/mount/ANN/> was used for the ANN.

In the experiments, an image database and a query image described below were used. The PCA-SIFT is used for local descriptors. The PCA-SIFT is provided on the Internet <URL: http://www.cs.cmu.edu/yke/pcasift/>. In the PCA-SIFT, 36-dimensional feature vectors are obtained. The size of a hash table was defined by expression 10.

$$H_{size} = 2^d$$ [Expression 10]

Processing time described below represents time taken for recognizing one query image.

It is noted that time taken for extracting feature vectors was not included in the processing time. A calculator having a CPU of an AMD Opteron 2.8 GHz and a memory of 32 GB was used.

2.1.1. Image Database

Figure 2:
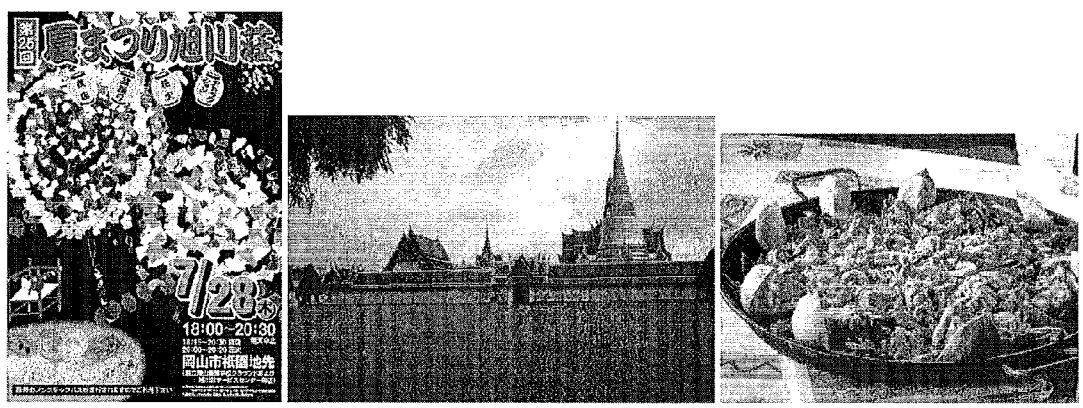
FIG. 2 shows examples of stored images used in experiments of the present embodiment.

An image used in the experiments will be described. First, three types of data sets A, B, and C collected by different methods were prepared. A included 3,100 images collected by using image search of Google. Keywords used for the image search included a "poster", a "magazine", a "cover", and the like. FIG. 2(a) shows examples of the images.

B included images published on a site of a PCA-SIFT. The number of the images was 18,500. These images mainly included pictures of nature, a person, and the like. FIG. 2(b) shows examples of the images. C included 78,400 images collected on Flickr which is a picture sharing site, by using tags of an "animal", a "birthday", "food", "Japan", and the like. These images mainly included pictures of an object, nature, a person, and the like, as shown in FIG. 2(c). It is noted that, upon collection of the above images, images having a size of 600×600 pixels or less were excluded, and the collected images are reduced such that the longitudinal sides thereof become 640 pixels or less. In addition, images having 100 feature vectors or less was also excluded. The averages of the lengths of sides of the images included in A, B, and C were 498 pixels, 612 pixels, and 554 pixels, respectively.

Figure 3:
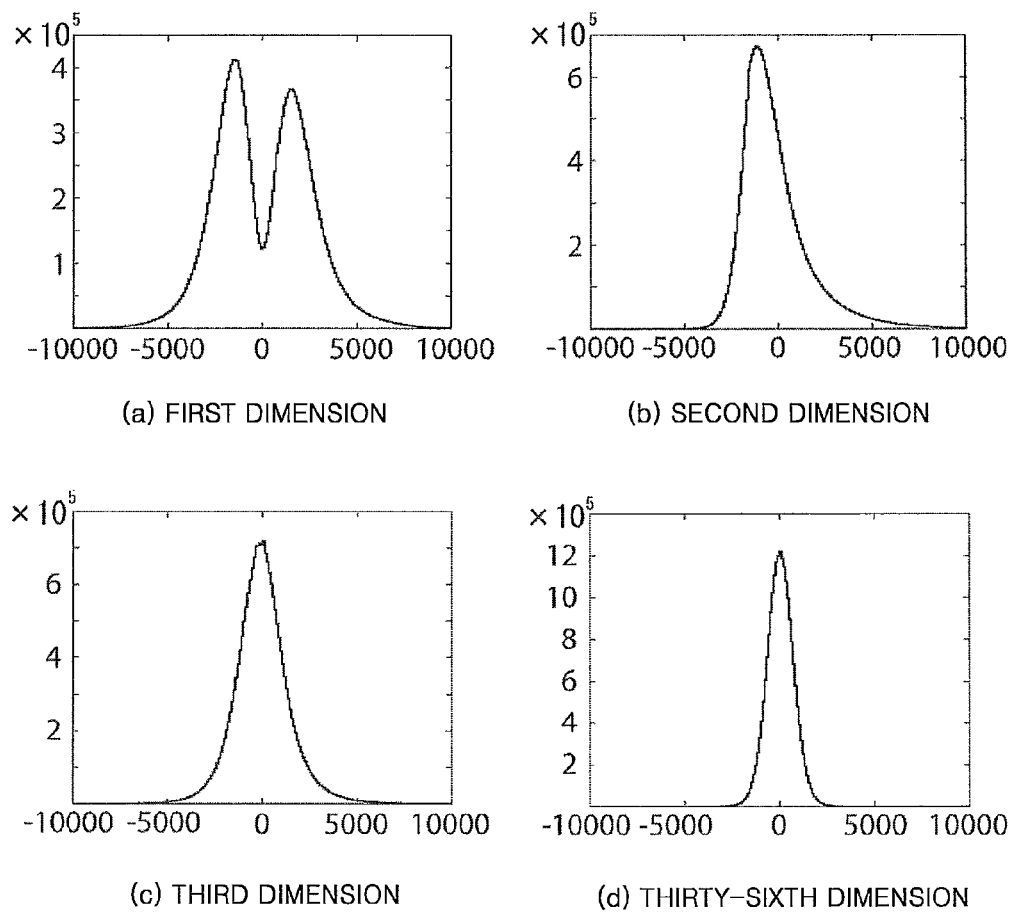
FIG. 3 shows graphs of distributions f(x), with respect to respective dimensions, of feature vectors in an image database according to the present embodiment.

Next, four types of databases including respective numbers of images shown in a table 1 were created by using the images of A, B, and C, and were used in the experiments. Here, a larger database included, as a part thereof, a smaller database. FIG. 3 shows a distribution f(x), with respect to each dimension, of feature vectors in the database including ten thousand images. In FIGS. 3(a) to 3(d), horizontal axes indicate the values of respective dimensions, and vertical axes indicate frequencies. The distribution of the first dimension is bimodal, and the second and the subsequent distributions are unimodal. In addition, the distribution of a later dimension had a smaller dispersion. All of the average values were close to 0. In addition, the average number of feature vectors included in one image was 2,000. In the experiments, regardless of the number of images included in the database to be used, f(x) obtained from the database including 10,000 images was used for quantization.

TABLE 1

| NUMBER OF STORED IMAGES | | 5,000 | 10,000 | 50,000 | 100,000 |
|---|---|---|---|---|---|
| BREAK-DOWN | A | 1,667 | 3,100 | 3,100 | 3,100 |
|  | B | 1,667 | 3,450 | 18,500 | 18,500 |
|  | C | 1,666 | 3,450 | 28,400 | 78,400 |

Figure 4:
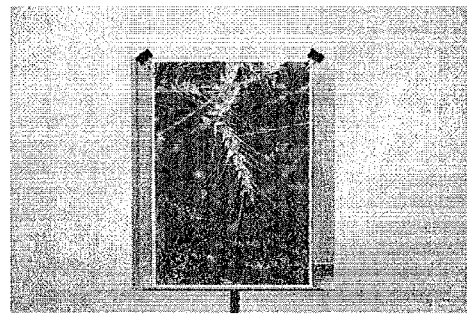
FIG. 4 shows examples of queries used in the experiments of the present embodiment.
Figure 4:
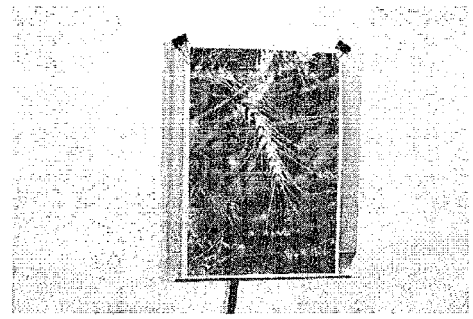
Figure 4:
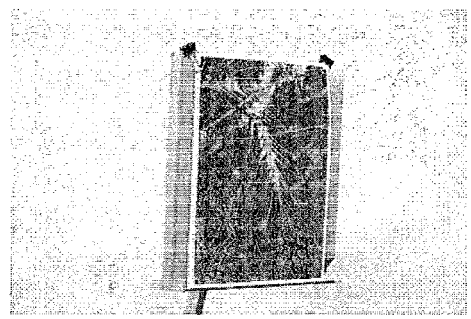
Figure 4:

2.1.2. Query Image 100 images, 200 images, and 200 images, i.e., 500 images in total, were selected for queries in a random manner from the data sets A, B, and C, respectively. Next, these images were printed on sheets of A4 paper, and the resultant sheets were shot by a camera. Examples of the shot images were shown in FIG. 4. As shown in FIGS. 4(a) to 4(c), each sheet was placed such that an entirety of the sheet could be shot, and then the sheet was shot while an angle θ of an optical axis of the camera with respect to the sheet was set to 90 degrees, 75 degrees, and 60 degrees. Further, a part of the sheet was shot, the angle θ being 90 degrees (FIG. 4(d)). As a result, four images in total were obtained with respect to one sheet of paper. Further, the sizes of the shot images were reduced to 512×341 pixels, and feature vectors were obtained by the PCA-SIFT. As a result, the average number of feature vectors obtained from one image was 612.

2.2. Memory Amount of Feature Vector, and Recognition Rate

Figure 5:
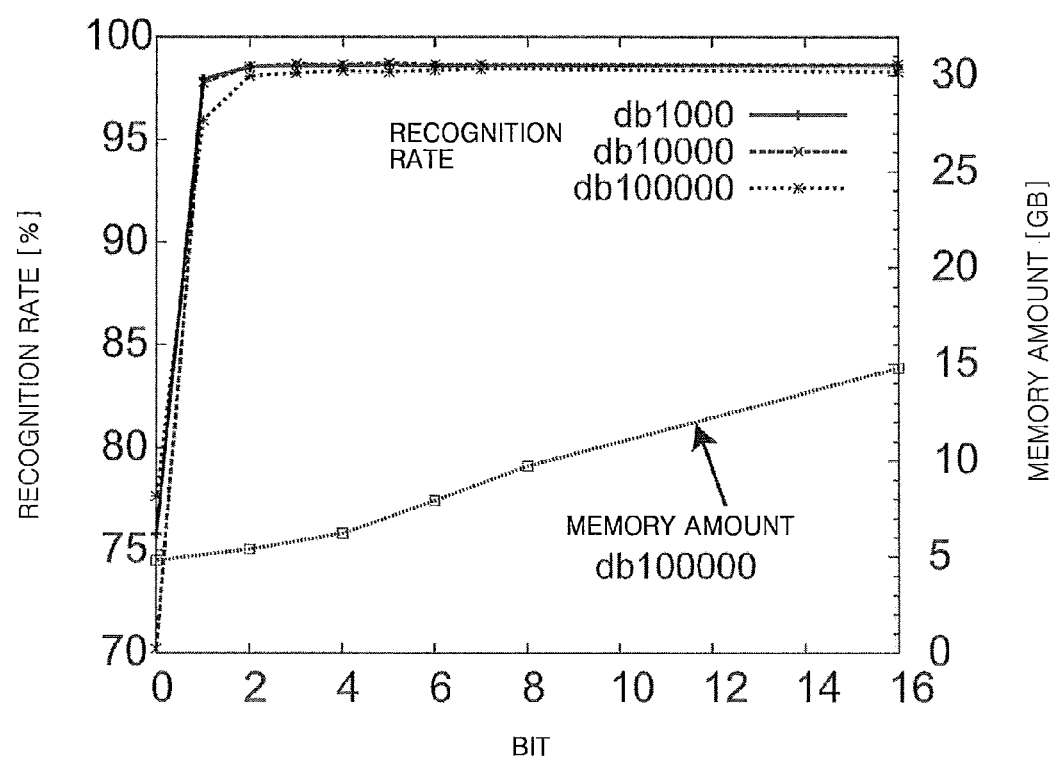
FIG. 5 is a graph showing a relation between the amount of memory for feature vectors and the recognition rate in the experiments of the present embodiment.

First, the degree of influence, on the recognition rate, of reduction of the amount of data by quantization was examined. FIG. 5 shows the result. The horizontal axis indicates a quantization bit number of each dimension of feature vectors. For example, in the case of 2 bits, feature vectors in the PCA-SIFT have 36 dimensions. Therefore, 2 bits×36=72 bits are needed per vector. It is noted that the cases of 16 bits and 0 bits are slightly particular cases. In the case of 16 bits, original data was directly used without performing quantization (technique of Noguchi, et al.). That is, in the present experiment, a condition that reduction of the amount of memory is prioritized and each dimension is represented by 16 bits was used as a basis of comparison. In the case of 0 bits, since there is no feature vector to be subjected to a distance calculation, votes were cast for all feature vectors included in sets X obtained from a hash table. The cases where the numbers of stored images were 1,000, 10,000, and 100,000 while parameters b=10, c=10, d=28, and e=400 were used, which parameters gave a preferable result in the case of 16 bits, were examined. In addition, a memory usage was only examined with respect to the database including 100,000 images.

From a graph, it is found that the recognition rate was not largely influenced even when the number of bits of each dimension was reduced to 2 bits. It is found that, in the case of 1 bit, the recognition rate significantly decreased as the number of stored images increased. It is considered that this is because lack of discriminability becomes a larger problem as the number of the stored feature vectors increases. It is found that, in the case of 0 bits, the recognition rate largely decreased. The above indicates that each dimension can be represented by 2 bits, that is, each feature vector can be represented by 9 bytes. In comparison with the case where each dimension was represented by 16 bits, it is found that the amount of data of one feature vector was reduced to ⅛, and that the actual memory usage could be largely reduced to about ⅓. In the subsequent experiments, the property in the case where each dimension is quantized into 2 bits will be described in detail.

2.3. Scalability

Next, the relations among the number of stored images, the recognition rate, and the processing time in the cases of 2 bits and 16 bits in the present embodiment were compared with each other.

Figure 6:
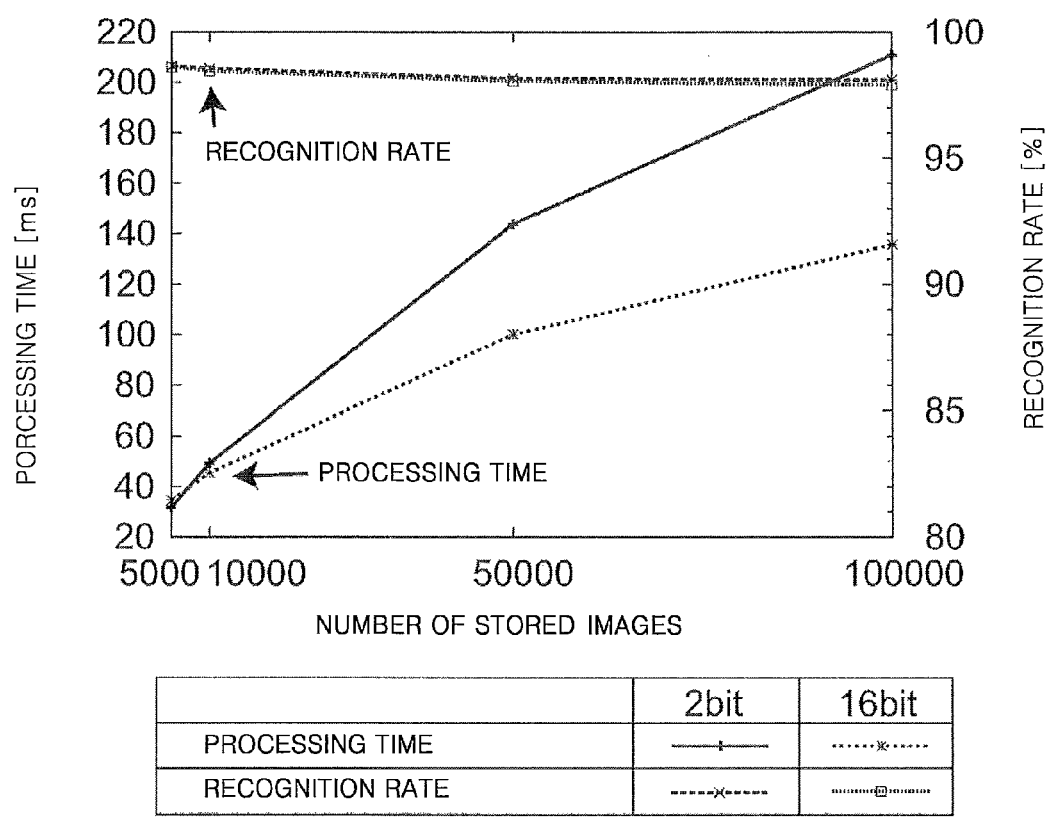
FIG. 6 is a graph showing a relation among the number of stored images, the recognition rate, and the processing time in the experiments of the present embodiment.

The experiments were performed while the number of stored images was varied in a range from 5,000 to 100,000. Similarly to the previous case, the parameters b=10, c=10, d=28, and e=400 were used. FIG. 6 shows the result of varying the number of stored images.

From a graph, it is found that although the recognition rate hardly varied, the processing time increased. For example, the processing time in the case where the number of stored images was 100,000 increased, by 1.6 times, from 135.8 ms to 210.9 ms.

It is considered that the increase of the processing time was due to distance calculations. This is because feature vectors to be subjected to distance calculations do not change regardless of whether in the case of 16 bits or 2 bits since the hash function has no relation with quantization of feature vectors. Two causes for the increase of the processing time of distance calculations are conceivable. The first one is processing of converting a quantized code into a median value v. The second one is bit calculations performed when 2-bit data was extracted from each dimension.

2.4. Parameters of the Present Embodiment, and Recognition Rate/Processing Time

Figure 7:
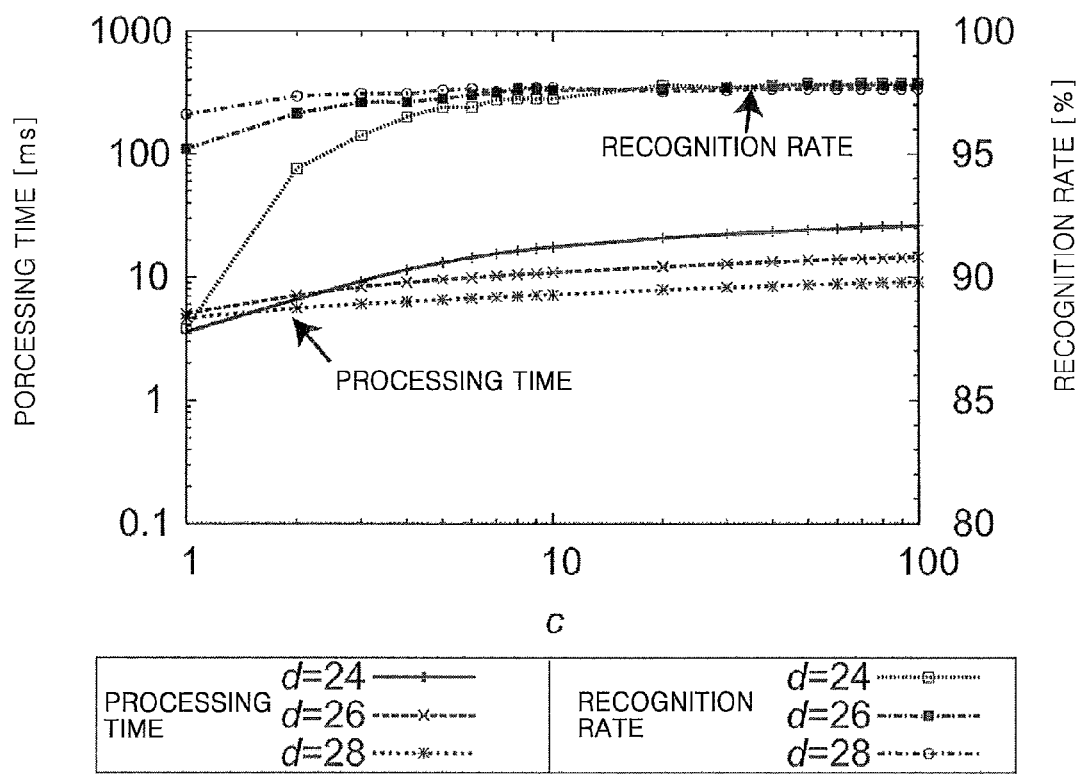
FIG. 7 is a graph showing a relation among a parameter c, the recognition rate, and the processing time in the experiments of the present embodiment.

From the experiments thus far, it is found that if feature vectors are quantized into 2 bits, the amount of data can be reduced without decreasing the recognition rate. This section describes confirmation of whether or not a relation between the parameters of the present embodiment and the recognition rate/processing time largely varied, in the case where feature vectors were quantized into 2 bits. The experiment was performed by using parameters b, c, d, and e, which are main parameters of the present embodiment. First, a relation among the threshold value c of collision, the number of dimensions d used for constructing a hash, the recognition rate/processing time will be described. In the experiment, the number of images of an image database was 10,000, and the size of a hash table was $H_{size=2}$. FIG. 7 shows a result of varying c while using the parameters e=200, b=10, and d=24, 26, and 28. It is found that the processing time decreased as c decreased. However, when c was excessively small, the recognition rate decreased. This is because feature vectors contributing to the recognition were eliminated as well. On the other hand, when c was increased, reduction of the recognition rate hardly occur even though the processing time increased. It is considered that this is because even if feature vectors that cannot be the nearest neighbor are retrieved, the feature vectors can be eliminated by distance calculations.

Figure 8:
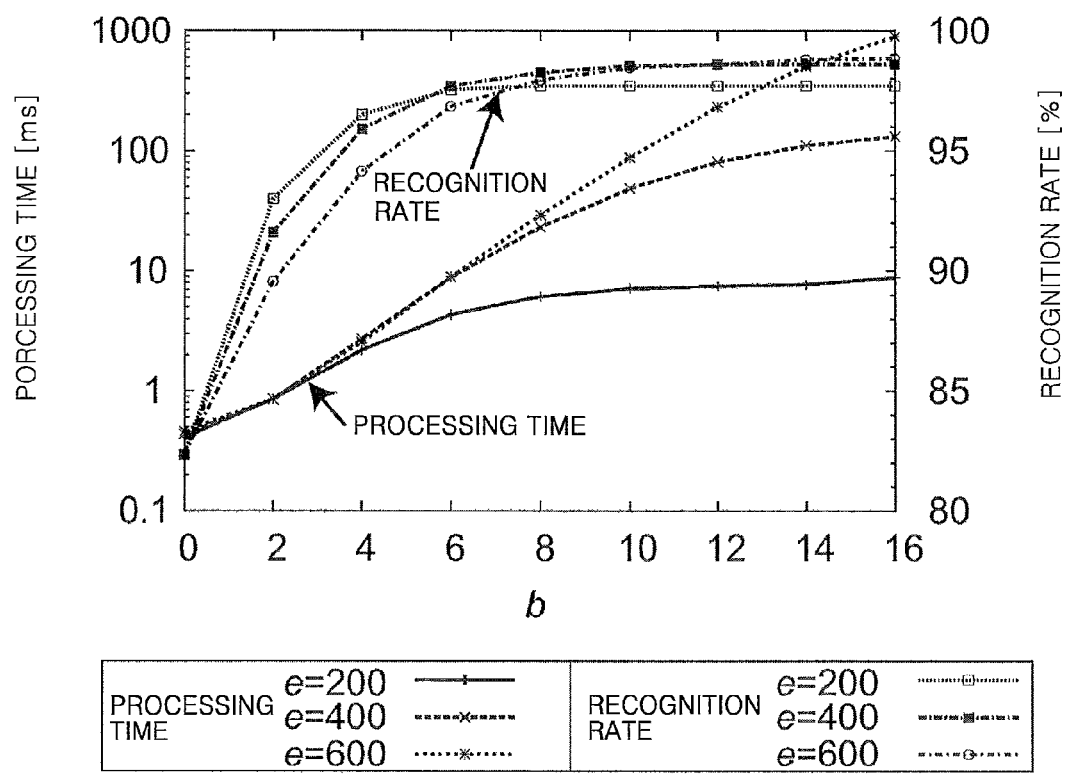
FIG. 8 is a graph showing a relation among parameters b and e, the recognition rate, and the processing time in the experiments of the present embodiment.

Next, a relation between the threshold value b of the number of dimensions to be subjected to the processing of "using both values", and the recognition rate/processing time will be described. FIG. 8 shows a result of varying b while using the parameters d=28, e=200, 400, and 600, and c=10. When b was increased, the recognition rate was improved even though the processing time increased. It is found that in the case where b was small, the recognition rate largely increased as the range e for determining targets of the processing of "using both values" decreased. This is expressed as follows. In retrieval processing, among the dimensions of each feature vector of a query, the last b dimensions in a range from −e to +e are determined as targets of the processing. In this processing, if e is large, the number of the determined dimensions reaches a threshold value b before a dimension needing the processing is determined. Therefore, the recognition rate decreases. In addition, if b is increased to a certain degree, the recognition rate and the processing time hardly increase with the increase in b. This is because there is no more feature vector having a dimension in a range from −e to +e, and because the number of indices to be subjected to the processing do not increase.

From the above, a preferable result can be obtained as long as e is not significantly large.

The above result of the experiments was not significantly different from that obtained by the technique of Noguchi, et al. Accordingly, it is considered that the influence of quantization on the parameters is slight.

2.5. Comparison with ANN

Figure 9:
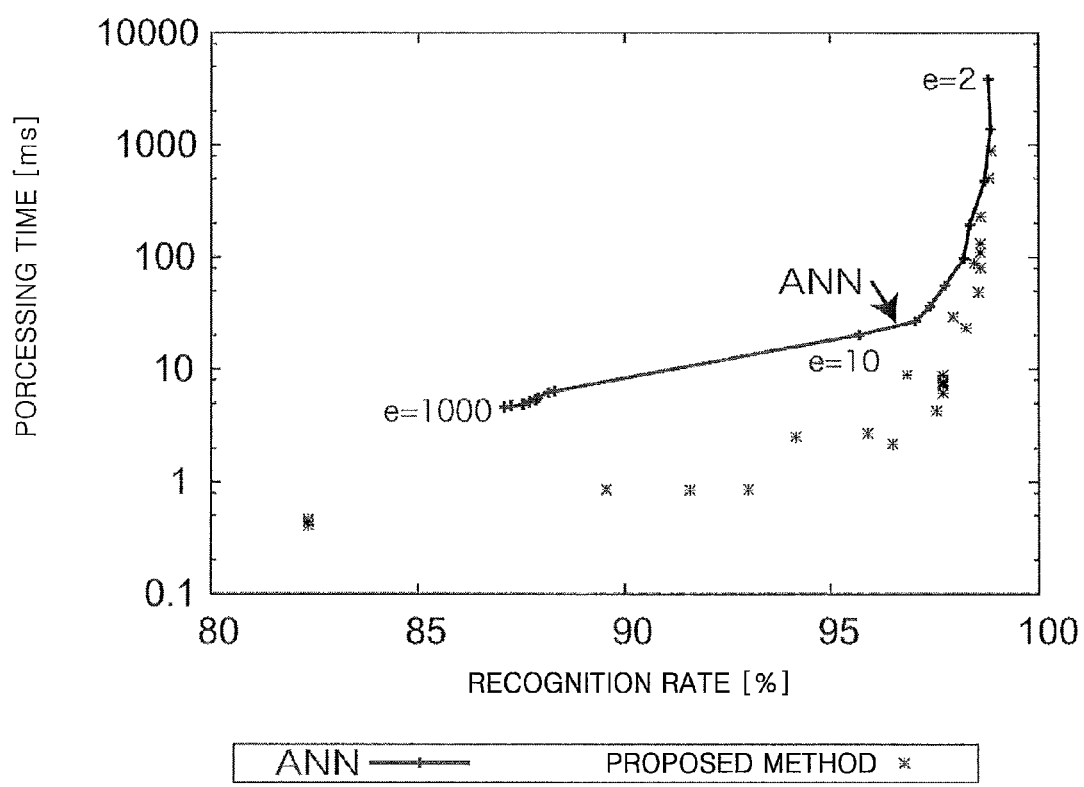
FIG. 9 is a graph showing characteristics of the recognition rates and the processing times in the experiments of the present embodiment and in an ANN which is a typical example of a conventional technique.

The method of quantizing each dimension into 2 bits was compared with the ANN which is a conventional technique of the approximate nearest neighbor searching, by using 10,000 images stored, while the parameters being varied. FIG. 9 shows a graph of the result, in which the horizontal axis indicates the recognition rate, and the vertical axis indicates the processing time.

The result obtained by varying the allowable error ϵ from 2 to 1,000 in the ANN was depicted as a line, which was used as a basis of the evaluation. A portion plotted on the right indicates a higher recognition rate, and a portion plotted at a lower position indicates a shorter processing time. Thus, a portion plotted on the right and at a lower position indicates a more excellent result. As seen from this graph, it is considered that the present embodiment is more excellent than the case of using the ANN.

TABLE 2

| METHOD | PARAMETER | 60 degrees ACCURACY | 60 degrees TIME | 75 degrees ACCURACY | 75 degrees TIME | 90 degrees ACCURACY | 90 degrees TIME | PART ACCURACY | PART TIME | AVERAGE ACCURACY | AVERAGE TIME |
|---|---|---|---|---|---|---|---|---|---|---|---|
| ANN | ∈ = 5 | 98.2 | 232.3 | 99.0 | 243.6 | 99.2 | 244.1 | 99.0 | 742.8 | 98.9 | 365.7 |
| 16 bit | ∈ = 10 | 97.4 | 48.4 | 98.8 | 53.1 | 98.6 | 53.1 | 98.6 | 153.2 | 98.4 | 76.9 |
|  | ∈ = 30 | 92.8 | 10.0 | 97.4 | 11.7 | 97.4 | 11.9 | 97.2 | 32.1 | 96.2 | 16.4 |

TABLE 2-continued

| METHOD | PARAMETER | 60 degrees ACCURACY | 60 degrees TIME | 75 degrees ACCURACY | 75 degrees TIME | 90 degrees ACCURACY | 90 degrees TIME | PART ACCURACY | PART TIME | AVERAGE ACCURACY | AVERAGE TIME |
|---|---|---|---|---|---|---|---|---|---|---|---|
| ANN 2 bit | $\in = 3$ | 98.6 | 865.2 | 99.0 | 909.1 | 98.8 | 904.8 | 99.0 | 2871.9 | 98.9 | 1387.8 |
|  | $\in = 5$ | 97.6 | 121.1 | 98.6 | 132.1 | 98.6 | 132.1 | 98.6 | 394.6 | 98.4 | 195.0 |
|  | $\in = 10$ | 91.6 | 12.3 | 97.2 | 14.4 | 97.2 | 14.5 | 96.8 | 39.7 | 95.7 | 20.2 |
| PROPOSED METHOD 16 bit | b = 14, c = 10, d = 28, e = 600 | 98.4 | 240.9 | 98.8 | 296.2 | 99 | 299.8 | 99 | 815.8 | 98.8 | 413.2 |
|  | b = 10, c = 10, d = 28, e = 400 | 98 | 23.3 | 98.8 | 28.3 | 98.6 | 28.8 | 98.6 | 76.6 | 98.5 | 39.2 |
|  | b = 4, c = 10, d = 28, e = 200 | 95.2 | 0.8 | 97.6 | 1.1 | 97.6 | 1.2 | 98 | 4.1 | 97.1 | 1.8 |
| PROPOSED METHOD 2 bit | b = 14, c = 10, d = 28, e = 600 | 98.4 | 295.6 | 98.8 | 362.0 | 8.6 | 368.5 | 99.4 | 997.8 | 98.8 | 506.0 |
|  | b = 10, c = 10, d = 28, e = 400 | 98.0 | 28.8 | 98.8 | 35.0 | 98.6 | 35.7 | 98.8 | 94.7 | 98.6 | 48.6 |
|  | b = 4, c = 10, d = 28, e = 200 | 93.4 | 1.1 | 98.4 | 1.5 | 97.6 | 1.5 | 96.6 | 4.7 | 96.5 | 2.2 |

Next, a table 2 shows the recognition rate and the processing time obtained when representative values of the parameters were used. First, in the ANN, the processing times needed for obtaining a recognition rate of 98.9% were compared between the case where each dimension was quantized into 16 bits and the case where each dimension was quantized into 2 bits. In the case where each dimension was quantized into 2 bits, the processing time needed for obtaining the same recognition rate largely increased. Meanwhile, in the present embodiment, the processing time moderately increased in comparison with the ANN. From the above, it is found that quantization increases the processing time needed for obtaining the same recognition rate. However, it is found that there is an advantage that the memory usage can be largely reduced by quantization.

As indicated in the above experiments, in the case where each dimension was quantized into 2 bits, the memory usage could be reduced to ⅓ while sacrificing the processing time, in comparison with the case where quantization was not performed. In addition, it is found that there is a trade-off relation among the memory usage, the processing time, and the recognition rate.

Various modifications of the present invention may be attained other than the above mentioned embodiment. Such modifications should not be deemed to be out of the scope of the present invention. The present invention should include all the modifications within the scope of the claims, their equivalents, and within the above scope.

DESCRIPTION OF THE REFERENCE CHARACTERS 1 image database processing apparatus
11 feature extraction section
13 scalar quantization section
15 storing section
17 retrieval section
21 storage image
23 retrieval query
25 image database
27 recognition result

The invention claimed is:

1. A method for constructing an image database that is used for object recognition comprising the steps of:
   extracting, from an image showing an object and to be stored in the image database, a plurality of local descriptors each of which is a vector representing respective local features of the image;
   scalar-quantizing the vector on a dimension by dimension basis of the vector; and
   storing into the image database the image and the corresponding scalar-quantized vectors, with (1) calculating an index value for referring to a bin of a hash table from each scalar-quantized vector by using a predetermined hash function, and (2) storing (i) the value of each scalar-quantized vector dimension and (ii) an image ID for identifying the image from which each vector is extracted into the bin referred to with use of the calculated index value as an entry;
   wherein each of the steps is executed by a computer and
   the storing step stores each vector so that, when an image showing an object in question is given as a query while a plurality of images are stored in the image database, the computer extracts a plurality of query local descriptors from the query through a similar step to the feature extraction step, quantizes each query local descriptor through a similar step to the scalar quantization step, retrieves vectors as neighbor vectors of each query local descriptor, each of which is retrieved from the vectors stored in the image database by using an algorithm of approximate nearest neighbor searching, obtains the image IDs attached to the neighbor vectors and determines at least one image(s) which shows the object in question based on the obtained image IDs; and
   wherein the scalar quantization step quantizes each vector dimension into a scalar number of 8 bits or less and 1 bit or more.

2. The method according to claim 1, wherein
the scalar quantization step quantizes each vector dimension into a scalar number of 2 bits or less.

3. The method according to claim 1 or 2, wherein
the storing step stores each vector through the step of when (i) the value of each scalar-quantized vector dimension and (ii) the image ID are stored as an entry into the bin corresponding to the vector, which has been extracted from the image to be stored in the image database, eliminating every entry stored in the same bin and preventing further entry from being stored in the bin in case where the number of the entries stored in the bin exceeds a threshold.

4. The method according to claim 3, wherein
the storing step stores each vector so that the computer determines the image(s) through the process of retrieving the neighbor vectors, and wherein
the computer calculates the index value using the quantized vector dimensions, further calculates one or more other index value(s) using one or more neighbor(s) of each quantized vector dimension, and retrieves the neighbor vectors from the vectors stored in the bins referred to with use of the calculated index values.

5. The method according to claim 4, wherein
the algorithm of the approximate nearest neighbor searching includes process of calculating a distance between each of the query local descriptors and the vectors stored in the bins referred to with use of the calculated index values; and specifies one or more vectors that are within a predetermined distance, or a vector in the shortest distance.

6. The method according to claim 3, wherein
the algorithm of the approximate nearest neighbor searching includes process of calculating a distance between each of the query local descriptors and the vectors stored in the bins referred to with use of the calculated index values; and specifies one or more vectors that are within a predetermined distance, or a vector in the shortest distance.

7. The method according to claim 2, wherein the algorithm of the approximate nearest neighbor searching includes process of calculating a distance between each of the query local descriptors and the vectors stored in the bins referred to with use of the calculated index values; and specifies one or more vectors that are within a predetermined distance, or a vector in the shortest distance.

8. The method according to claim 1, wherein
the algorithm of the approximate nearest neighbor searching includes process of calculating a distance between each of the query local descriptors and the vectors stored in the bins referred to with use of the calculated index values; and specifies one or more vectors that are within a predetermined distance, or a vector in the shortest distance.

9. An apparatus for processing an image database that is used for object recognition comprising:
a feature extraction section for extracting, from an image showing an object and to be stored in the image database, a plurality of local descriptors each of which is a vector representing respective local features of the image;
a scalar quantization section for scalar-quantizing the vector on a dimension by dimension basis of the vector;
a storing section for storing into the image database the image and the corresponding scalar-quantized vectors, with (1) calculating an index value for referring to a bin of a hash table from each scalar-quantized vector by using a predetermined hash function, and (2) storing (i) the value of each scalar-quantized vector dimension and (ii) an image ID for identifying the image from which each vector is extracted into the bin referred to with use of the calculated index value as an entry; and
a retrieval section, when an image showing an object in question is given as a query while a plurality of images are stored in the image database, and after the extraction section extracts a plurality of query local descriptors from the query in a similar manner as in the image to be stored and the scalar quantization section quantizes each query local descriptor in a similar manner as in the image to be stored, for retrieving neighbor vectors for respective query local descriptor among the vectors stored in the image database using an algorithm of the approximate nearest neighbor searching, obtaining the image IDs attached to the neighbor vectors, and determining at least one image(s) which shows the object in question based on the obtained image IDs,
wherein the scalar quantization step quantizes each vector dimension into a scalar number of 8 bits or less and 1 bit or more.

10. A non-transitory computer-readable medium, upon which is stored a program for processing an image database that is used for object recognition, the apparatus causing a computer to function as:
a feature extraction section for extracting, from an image showing an object and to be stored in the image database, a plurality of local descriptors each of which is a vector representing respective local features of the image;
a scalar quantization section for scalar-quantizing the vector on a dimension by dimension basis of the vector;
a storing section for storing into the image database the image and the corresponding scalar-quantized vectors, with (1) calculating an index value for referring to a bin of a hash table from each scalar-quantized vector by using a predetermined hash function, and (2) storing (i) the value of each scalar-quantized vector dimension and (ii) an image ID for identifying the image from which each vector is extracted into the bin referred to with use of the calculated index value as an entry; and
a retrieval section, when an image showing an object in question is given as a query while a plurality of images are stored in the image database, and after the extraction section extracts a plurality of query local descriptors from the query in a similar manner as in the image to be stored and the scalar quantization section quantizes each query local descriptor in a similar manner as in the image to be stored, for retrieving neighbor vectors for respective query local descriptor among the vectors stored in the image database using an algorithm of the approximate nearest neighbor searching, obtaining the image IDs attached to the neighbor vectors, and determining at least one image(s) which shows the object in question based on the obtained image IDs,
wherein the scalar quantization step quantizes each vector dimension into a scalar number of 8 bits or less and 1 bit or more.

* * * * *